A. D. Briggs,
Truss Bridge
No. 2,070. Reissued Sept. 12, 1865.
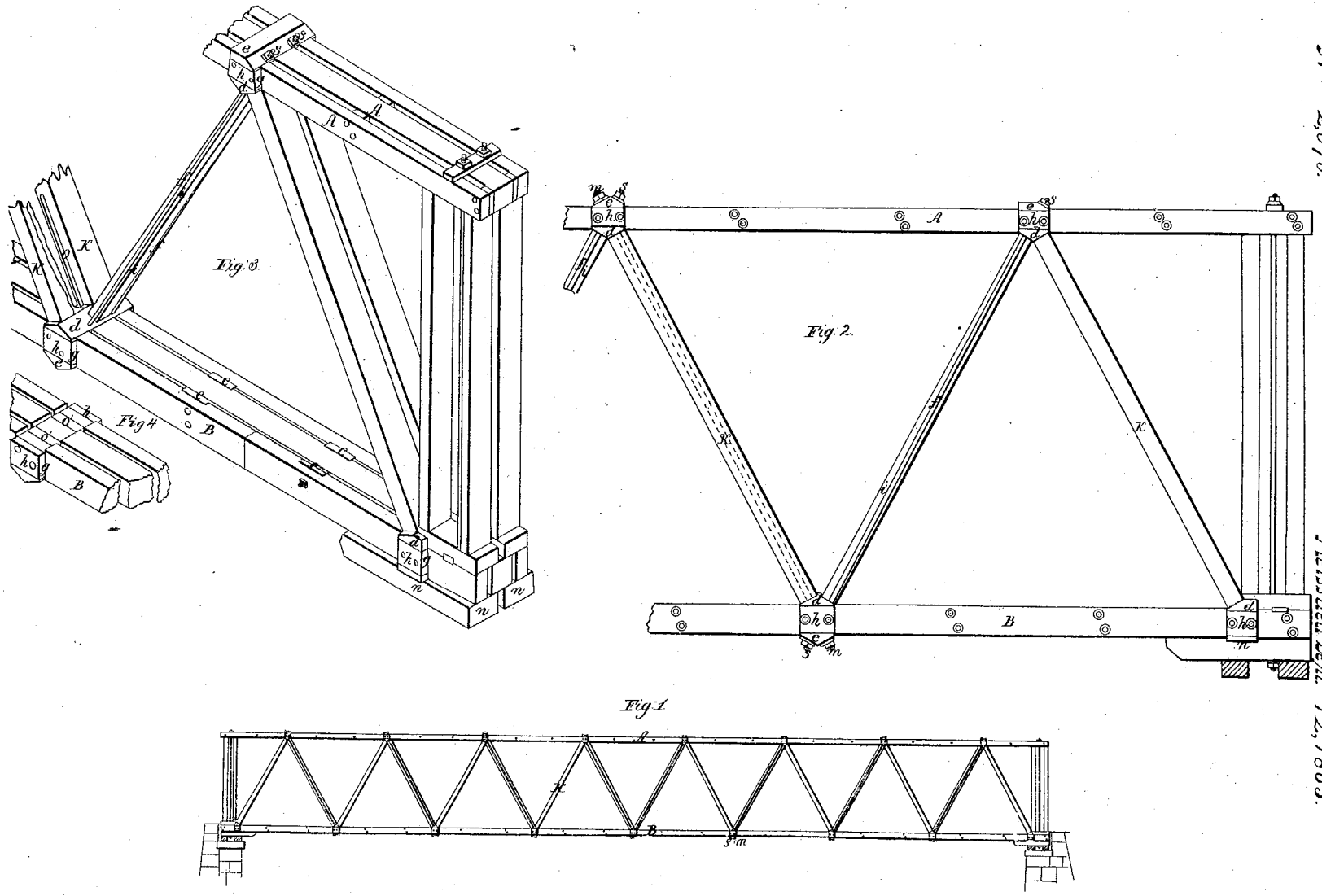
N. PETERS, PHOTO-LITHOGRAPHER, WASHINGTON, D. C.

UNITED STATES PATENT OFFICE.

ALBERT D. BRIGGS, OF SPRINGFIELD, MASSACHUSETTS.

IMPROVEMENT IN TRUSS-BRIDGES.

Specification forming part of Letters Patent No. 20,987, dated July 27, 1858; Reissue No. 2,070, dated September 12, 1865.

*To all whom it may concern:*

Be it known that I, ALBERT D. BRIGGS, of Springfield, Hampden county, Commonwealth of Massachusetts, have invented certain new and useful Improvements in Truss-Frames for Bridges and other Structures; and I do hereby declare that the following is a full, clear, and exact description of the same, reference being had to the accompanying drawings, and to letters of reference marked thereon.

In the drawings, Figure 1 is a side elevation of a truss-frame constructed according to my invention. Fig. 2 is a side view of a section of the same on an enlarged scale. Fig. 3 is a perspective view of a section of the same truss-frame. Fig. 4 is a perspective view of part of the lower chord or stringer, showing the manner of placing packing keys or blocks between the chord-sticks and between the bearing-blocks of the braces which constitute one part of my invention.

Similar letters of reference indicate corresponding parts in the several figures.

This invention consists in a certain method of increasing the bearing-surface for the bearing-blocks against which the braces abut in truss-frames.

To enable others skilled in the art to make and use my invention, I will now proceed to describe the manner in which it is applied to practice.

A A is the top chord or stringer, and B B the bottom chord or stringer. These I usually make each of three or more pieces or sticks of timber, which sticks are kept apart by means of the keys *c e*, which pass vertically through the openings in the chords into which they are notched to prevent the chord-sticks from slipping past each other. Upon the upper side of the bottom chord and the under side of the top are placed bearing-blocks or angle-pieces *d d*, against which the main braces *k k*, which are arranged in pairs, and the counter-braces *i i*, which are arranged singly, abut. These braces, forming the panels of the bridge, are shown in the drawings so arranged that the bearing-blocks *d d* of the top chord are in vertical planes which pass through or near the centers of the spaces between bearing-blocks of the bottom chord, and that the bearing-blocks of the bottom chord are in vertical planes which pass through or near the centers of spaces between the bearing-blocks of the top chord, which makes the panels of or nearly of the form of a series of isosceles triangles; but I do not consider this arrangement essential, as the bearing-blocks may be in any other position in relation to each other, without interfering with my invention.

The tension-rods *f f*, by which the straining up of the frame is effected and regulated, are double, having the counter-braces *i i* arranged between them. These rods are screwed up at each end and fitted with nuts, and they pass through the bearing-blocks *d d* and through the bearing-keys, (which will be presently described,) and through bearing-blocks or angle-pieces *e e* above the top and below the bottom chord, and their nuts are screwed up against the outside bearing-blocks or angle-pieces *e e*, as shown at *s s* in Figs. 1, 2, and 3. Between each pair of main braces *k k* (excepting the end pairs, where it is not necessary) there is a counter tension-rod, *o o*, which, like the tension-rods *f f*, pass through the bearing-blocks *d* and *e*, and are screwed at their ends and fitted with nuts, which screw up against the outer bearing-blocks, *e e*, as represented at *m m* in Figs. 1 and 2.

When the tension-rods *f f* are screwed up with the braces *k k* and counter-braces *i i* in their proper places to keep the chords apart and the counter-tension rods *o o*, tightened up to prevent vertical vibration, a truss-frame is formed which cannot be affected by the passing of a variable load which is within its capacity to sustain.

The method of increasing the bearing-surface for the bearing-blocks *d* and *e* is as follows: I make the said bearing-blocks to extend beyond the sides of the chords, as shown at *g g* in Figs. 3 and 4, and between the corresponding bearing-blocks *d e d e* of each chord I fit blocks *h h* and blocks or keys *c c*, of hard wood, to keep the bearing-blocks apart and prevent the crushing of the chord-timbers by the screwing up of the nuts of the tension-rods, the blocks *h h* being placed between the ends of the bearing-blocks, which extend beyond the sides of the chords, and a block or key, *c'*, being fitted tightly into each opening between the chord-sticks. The tension-rods *f f* pass through the above-described blocks *c' c'*.

The bearing-blocks *e e* of the lower chord, with the exception of those at the ends the of frame, are held up to their places by the tension and counter-tension rods, but the bearing-blocks next the end of the frame are supported by the bolsters or corbels *n n*, which project laterally beyond the sides of the chord sticks for the purpose of sustaining the blocks *h h*, at the points of bearing over the abutments and piers.

The wooden blocks *c′ c′* and *h h* are intended to have substantially the same effect as the metallic sockets which constitute part of the subject of Wm. Howe's patent of 1846—viz., to prevent the crushing of the soft timber of the chords by the bearing blocks—but the side blocks, *c′ c′* and *h h*, are also intended to obviate some of the objections to the use of said metallic sockets, which may be briefly enumerated as follows: First, the cost of the heavy cast-iron bearing-blocks with the sockets attached; second, the liability to breakage; third, the socket must be of a certain length, and, as the timber is usually framed in an unseasoned condition, the chords must, in framing therefor, be left so deep that they will when seasoned correspond with the depth of the socket, or if they are cut to the depth of the socket when framed, the timber shrinks away from the casting and leaves a loose joint, which is prejudicial to the durability of the structure.

My method of providing for a bearing-surface for the blocks *d e* by the employment of the blocks *h h* and *c′ c′* obviate all the above difficulties, and said blocks serve to keep the bearing-blocks from crushing the chords in a manner far more effective than the iron sockets, as the blocks *c′ c′* can be fitted tightly between the chord-sticks while the truss is being framed, and by making said blocks *c′ c′* entirely fill up the spaces between the chord-sticks, and providing blocks *h h* outside of the chords, a very much greater amount of bearing-surface for the blocks *d e* is obtained than is provided for by the cast-iron sockets, and it is this characteristic that constitutes the important feature of this part of my invention and makes it not merely a substitute of wood for iron.

I do not claim separately any of the parts of the truss-frame; but

What I do claim as my invention, and desire to secure by Letters Patent, is—

1. The method of increasing the bearing-surfaces for the blocks *d d e e* by the employment of the blocks or keys *c′ c′* fitted, between the chord-sticks and between the bearing-blocks *d d e e*, substantially as described.

2. The employment of the blocks *h h*, fitted between the bearing-blocks *d d e e* on the outside of the chord-sticks, substantially as herein set forth.

A. D. BRIGGS.

Witnesses:
J. B. GARDINER,
J. R. SMITH.